(12) United States Patent
Livshits (10) Patent No.: US 7,076,486 B2
(45) Date of Patent: *Jul. 11, 2006

(54) METHOD AND SYSTEM FOR EFFICIENTLY IDENTIFYING DIFFERENCES BETWEEN LARGE FILES

(75) Inventor: Artem Y. Livshits, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/034,965

(22) Filed: Jan. 14, 2005

(65) Prior Publication Data

US 2005/0131860 A1 Jun. 16, 2005

Related U.S. Application Data

(63) Continuation of application No. 10/133,520, filed on Apr. 26, 2002, now Pat. No. 6,904,430.

(51) Int. Cl.
G06F 17/30 (2006.01)
G06F 12/00 (2006.01)
G06K 9/00 (2006.01)

(52) U.S. Cl. .............. 707/6; 707/3; 707/200; 382/130

(58) Field of Classification Search ............ 707/1, 707/3, 6, 10, 100, 101, 102, 103 R, 4, 104.1, 707/201, 204; 709/217, 218, 201, 203, 219; 382/130; 703/18; 705/1; 717/170
See application file for complete search history.

(56) References Cited

U.S. PATENT DOCUMENTS

| | | | | |
|---|---|---|---|---|
| 5,479,654 A | * | 12/1995 | Squibb | 707/201 |
| 5,574,906 A | * | 11/1996 | Morris | 707/1 |
| 5,634,039 A | * | 5/1997 | Simon et al. | 703/18 |
| 5,634,052 A | * | 5/1997 | Morris | 707/1 |
| 5,755,206 A | * | 5/1998 | Takahashi et al. | 123/406.37 |
| 5,778,395 A | * | 7/1998 | Whiting et al. | 707/204 |
| 5,919,247 A | * | 7/1999 | Van Hoff et al. | 709/217 |
| 6,052,531 A | * | 4/2000 | Waldin et al. | 717/170 |
| 6,131,085 A | * | 10/2000 | Rossides | 705/1 |
| 6,233,589 B1 | * | 5/2001 | Balcha et al. | 707/203 |
| 6,272,535 B1 | * | 8/2001 | Iwamura | 709/217 |
| 6,374,250 B1 | * | 4/2002 | Ajtai et al. | 707/101 |
| 6,377,957 B1 | * | 4/2002 | Jeyaraman | 707/200 |
| 6,704,725 B1 | * | 3/2004 | Lee | 707/4 |
| 6,816,872 B1 | * | 11/2004 | Squibb | 707/200 |

OTHER PUBLICATIONS

Anderson, Thomas E. et al., "Serverless Network File Systems", 1995 ACM, pp. 109-126.*

(Continued)

*Primary Examiner*—Shahid Alam
(74) *Attorney, Agent, or Firm*—Lee & Hayes, PLLC (57) ABSTRACT

Methods and data structures are disclosed for carrying out identifying differences between large files comprising many lines (or other units of comparison such as rows, words, paragraphs, sentences, etc.). The disclosed methods and data structures facilitate and carry out a streamlined, yet thorough comparison of two files to identify differences between them. The streamlining is achieved by pre-processing the files prior to submitting them to any known longest common subsequence (LCS) search engine. The output of the LCS generator is post-processed to compensate for changes to the sequences introduced by the pre-processing stage.

27 Claims, 6 Drawing Sheets

OTHER PUBLICATIONS

Schmuck, Frank et al., "GPFS: A Shared-Disk File System for Large Computing Clusters", Proceedings of the Conference on File and Storage Technologies (FAST '02), Jan. 28-30, 2002, pp. 231-244.*

Soltis, Steven R. et al., "The Global File System", Proceedings of the Fifth NASA Goddard Space Flight Center Conference on Mass Storage System and Technologies, Sep. 17-19, 1996, College Park, MD, pp. 1-23.*

Burns, R. et al., A Linear Time, Constant Space Differencing Algorithm, Department of Computer Science, University of California Santa Cruz, 8 pages.

Myers, Eugene W., "An O(ND) Difference Algorithm and Its Variations", *Algorithmica #2*, 1986, 1:251-266.

Heckel, Paul, "A technique for Isolating Differences Between Files", *ACM Communication*, #4, 1978, 21:264-268.

* cited by examiner

File Line Sequence: {a,b,c,y,d,e,f,g,h}

| Ordinal (Translated Line #) | Index (Real Line #) | Value |
|---|---|---|
| 0 | 0 | a |
| 1 | 1 | b |
| 2 | 4 | d |
| 3 | 5 | e |
| 4 | 6 | f |
| 5 | 7 | g |

FIG. 6a

File Line Sequence: {a,b,x,d,e,f,z,g,a}

| Ordinal (Translated Line #) | Index (Real Line #) | Value |
|---|---|---|
| 0 | 0 | a |
| 1 | 1 | b |
| 2 | 3 | d |
| 3 | 4 | e |
| 4 | 5 | f |
| 5 | 7 | g |
| 6 | 8 | a |

FIG. 6b

METHOD AND SYSTEM FOR EFFICIENTLY IDENTIFYING DIFFERENCES BETWEEN LARGE FILES

FIELD OF THE INVENTION

This invention generally relates to the area of computer systems. The present invention concerns software development/productivity enhancement tools, and in particular, methods and systems for generating a set of differences between two files.

BACKGROUND OF THE INVENTION

There exists a general need in the area of file editors to quickly and efficiently identify changes between earlier and later versions of two files. As used herein, the term "file" should be interpreted broadly to include a logical grouping of a sequence of units, and a unit is any group of data within a file that is subject to comparison (e.g., a line of text within a source code file). One method of comparing two files and identifying differences comprises using a longest common subsequence (LCS) algorithm. An LCS is the set of properly ordered lines that can be identified between two files. In the case of two text files (e.g., source code files) having N and M lines respectively, if there exists an LCS consisting of L lines, then the number of differences "D" equals M+N−2L. In other words the number of differing lines equals the total number lines minus the set of lines in the LCS that are determined to be unchanged between the two files.

An LCS search algorithm is described in "An O(ND) Difference Algorithm and Its Variations," by Eugene W. Myers, and published in Algorithmica #2, 1986, 1:251–266. The complexity of computing the LCS using such algorithm is $O(N+M+D^2)$ in the typical case involving text files and $O((N+M)*D)$ complexity in a worst case. The worst case involves files with many repeating lines, e.g. {a, b, a, b} and {b, a, b, a}. In such cases the LCS algorithm checks a number of different possibilities. Meaningful text files usually have a relatively small number of repeating lines. As one can see from the above equations, the complexity of a search for the LCS to identify changes between two files is highly dependent upon "D", the number of the number of differing lines present in the two files. Thus, tracking changes in large files containing many differences can consume vast amounts of time and computing resources.

SUMMARY OF THE INVENTION

The present invention comprises a method for performing a comparison operation upon two files to identify their differences and render a description of such differences (e.g., a longest common subsequence). The method includes a pre-processing stage that eliminates units of comparison (e.g., lines), from each of the two compared files, that are only present in one of the files. The modifications to the two compared files are maintained in translation tables. The modified files are then submitted to a file comparison/difference search engine.

During a second stage of the method, the search engine, such as by way of example a longest common subsequence (LCS) search engine, performs a core difference search operation. Rather than operating upon the original files that potentially include a large number of unique units (e.g., lines) that are only found in one of the two files, the difference search engine performs its search operation upon the modified files that, as a result of the pre-processing stage, no longer include most, if not all, of the units found within only one of the files. The second stage renders a description of the differences between the two modified files identified by the search engine.

Thereafter, a post-processing step restores differences identified during the pre-processing step. The post-processing step receives the file difference description rendered by the second stage and renders a final difference description that takes into account the units removed from the two files during the pre-processing stage. This step involves at least converting line numbers and introducing breaks (changes) into the difference description rendered for the modified files.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

In an embodiment of the present invention a computer implements a set of steps described herein for identifying differences between two files, at least in part, by executing software instructions, such as program modules. Generally, program modules include routines, objects, components, data structures and the like that facilitate performing particular tasks or implementing particular abstract data types. The term "program" includes one or more program modules.

Figure 1:
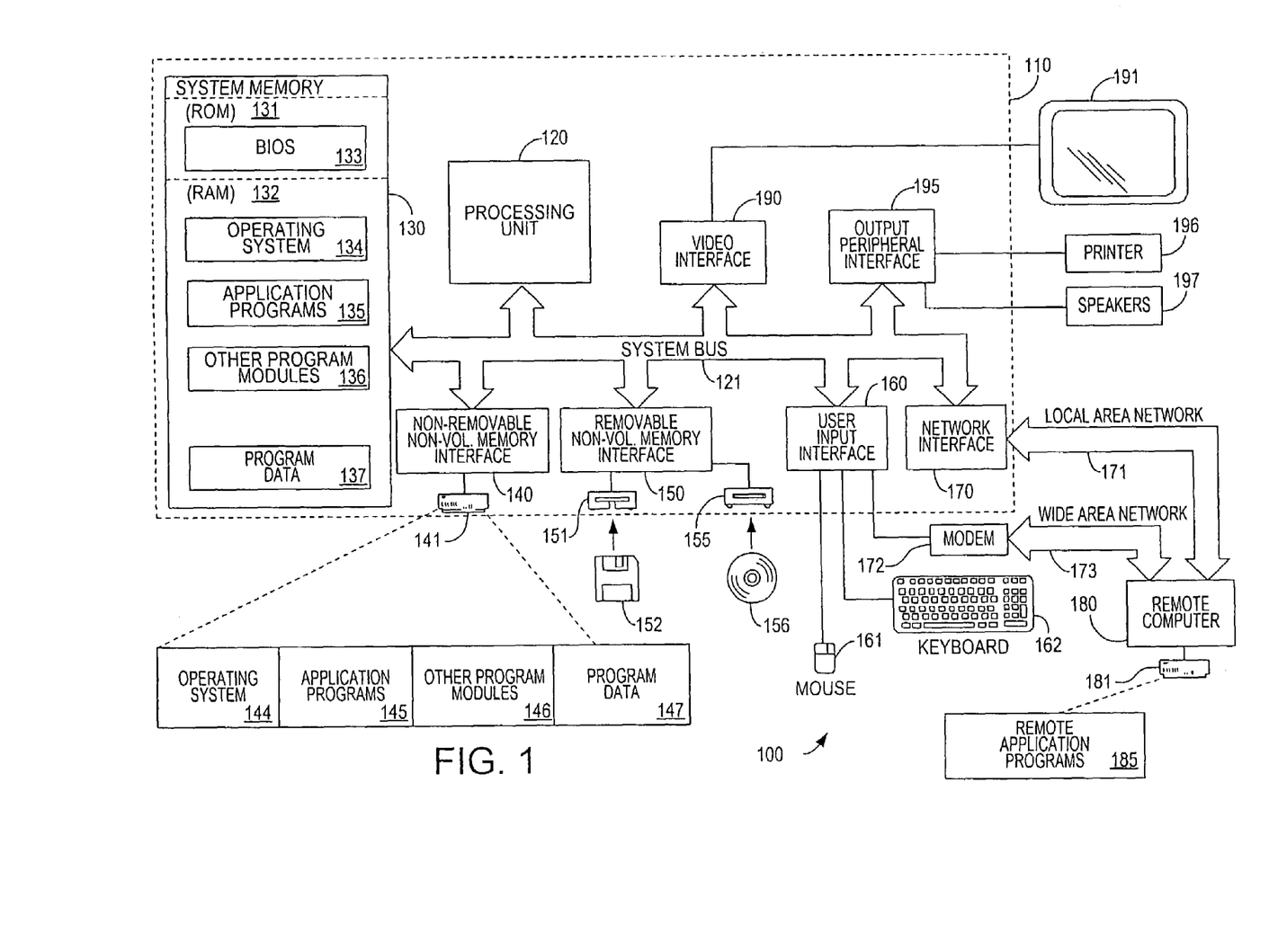
FIG. 1 is a simplified schematic illustrating an exemplary architecture of a computing device upon which at least portions of the test matrix generation/execution method/program modules of the invention are executed.

FIG. 1 illustratively depicts an example of a suitable operating environment 100 for carrying out at least a portion of the process for identifying differences between two files incorporating the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
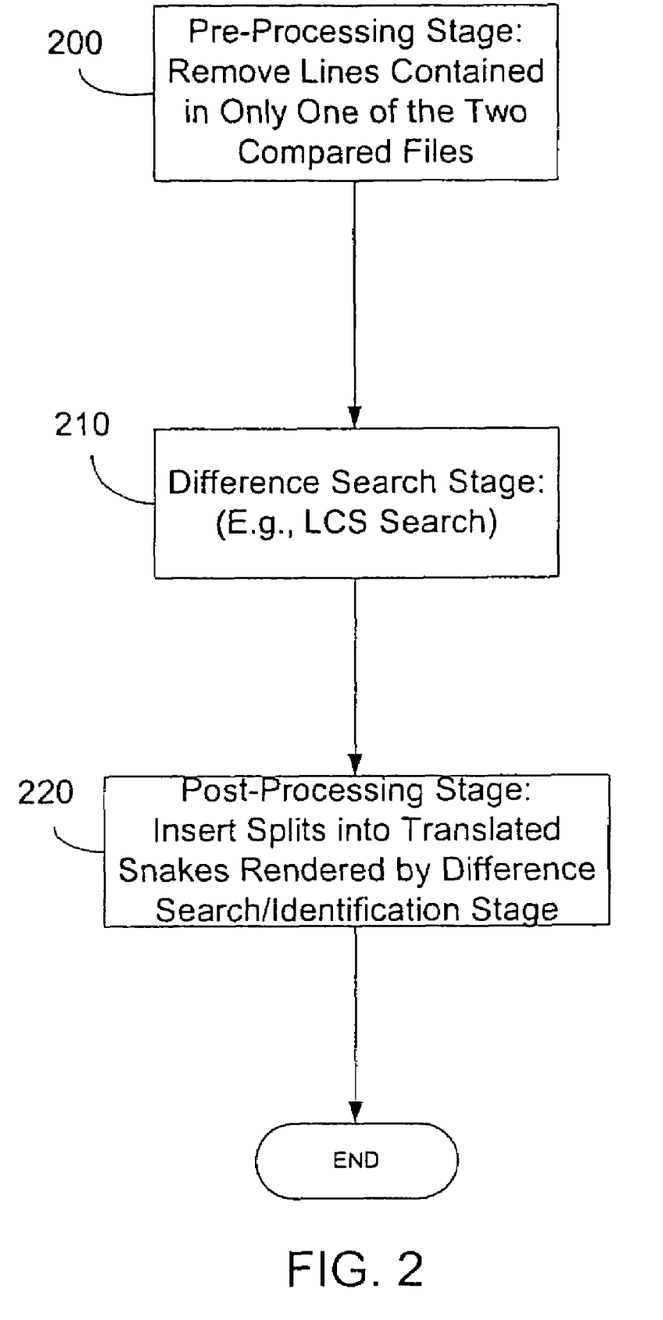
FIG. 2 is a flowchart summarizing a set of stages for identifying differences between two large files having potentially many differences.

Exemplary methods and supporting structures are disclosed herein below in accordance with embodiments of the invention. With reference now to FIG. 2, the method steps of an overall system for identifying differences (in the form of a longest common subsequence in the form of a set of snakes) in a file can generally be grouped into three stages. During a pre-processing stage 200, unique lines (lines that are only found in one of the two compared files) are identified and temporarily set aside from the remaining lines within the files for purposes of generating an LCS. In an embodiment of the invention, two translation tables are generated including (either explicitly or by implication) a value for the compared unit (e.g., a line within a source code file) within the file, the original line position ("index") of the value, and the translated position ("ordinal") of the value in the file after unique lines have been deleted. The translated position, or ordinal, of a value is implied by the order of the entries in the translation table (i.e., the first entry corresponds to the first translated line, second entry corresponds to second translated line, etc.).

During an LCS search stage 210, after removing the unique lines, the two modified input files containing the remaining lines are provided to an LCS search engine.

The LCS search engine performs well-known operations to render a description of a longest common subsequence based upon the modified input files rendered by the pre-processing stage 200.

During a post-processing stage 220, after the LCS for the two modified input files has been determined during stage 210, the LCS output is modified, by re-inserting the differences identified (and set aside) during the pre-processing stage 200, to render a comparison output (in the form of a set of snakes) identifying all differences between two input files. The pre-processing stage 200 and post-processing stage 220 are described in detail herein below. However, the LCS search stage 210, comprising execution of any well-known LCS search algorithm, will not be described in view of the many known documented ways in which it is performed. Thus, the focus of the discussion herein below is on the unique pre-processing and post-processing of compared files in accordance with the present invention.

Figures 3A, 3B:
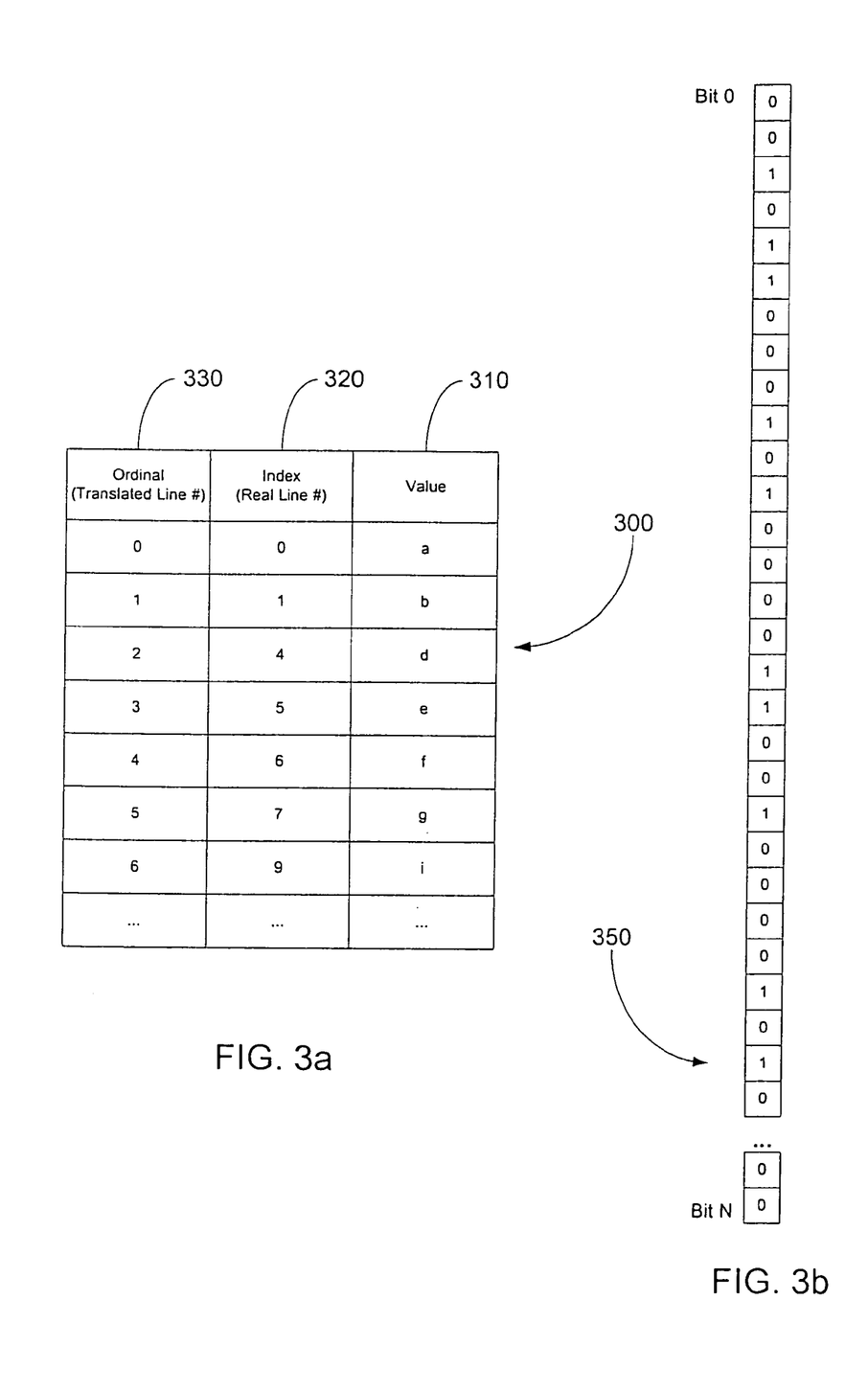
FIG. 3a is a schematic drawing depicting an exemplary logical data structure for maintaining translation information associated with the removal of particular units of data from two compared files during a pre-processing stage depicted in FIG. 2.
FIG. 3b is a schematic drawing depicting an exemplary data structure facilitating a symmetrical comparison of compared units (e.g., lines) between a first and second lines and deleting units only present in one of the two files.

Before describing the steps of stage 200 (the pre-processing stage) in detail, attention is directed to FIGS. 3a and 3b that show exemplary translation table and bitmap array structures that facilitate carrying out the first stage of a method embodying the present invention. Two such translation tables are rendered during stage 200, one each for the two compared files. It is noted that the structure of a translation table in FIG. 3a is a logical representation rather than a physical representation. The logical structure/functionality of the translation table depicted in FIG. 3a is achieved by a simple array including only a set of indexes 320. This simplification or the structure depicted in FIG. 3a is possible because the ordinal values correspond to the position of the index in the array 300 and the values are contained in the original sequence and can be extracted from there using the translation table. Furthermore, while not depicted in the drawings, a "Real Table" generated for each of the two original files stores an ordered array (one row per line in the original files). Each row (element) of the array includes: (1) a calculated hash (or more generally a mapping function) value, and (2) an offset value of the line within the original file.

Each row of the translation tables corresponds to a particular comparison unit of a file. In the present example, the unit of comparison is a line. However, in alternative embodiments, the unit of comparison is a word, a sentence, a paragraph, a database row, etc. As shown in the figure, each row of a translation table 300, corresponding to a line within a source code file, includes three elements (two of which may be implicit). A first element 310 stores a value corresponding to the contents of a unit of comparison within the file. In an exemplary embodiment of the invention, the first (potentially implicit) element 310 references the contents of a line in a file. In other embodiments, the comparison unit corresponds to a word, a sentence, etc. A second (explicit) element 320 stores an index value corresponding to the position of the line in the file, prior to removal of unique lines. This value facilitates reconstruction of an actual LCS during the post-processing stage 220 of the LCS generation method embodying the present invention. A third (potentially implicit) element 330 stores an ordinal value representing the position of the line in the file, after removal of unique lines. The ordinal values are utilized by the core LCS search algorithm during the LCS search stage 210.

Turning briefly to FIG. 3b, a bitmap array 350 is depicted. The bitmap array 350 comprises a set of bits ordered from zero to N where N is at least twice the number of lines of the larger of two compared files. The bits of the array are set in accordance with a mapping algorithm that renders a value based upon the value of a file line's contents. Increasing the size of the array 350 reduces the probability that two different lines will render a same mapped value—referred to as a collision. The usage of the bitmap array is discussed further herein below.

Before describing a particular example of the pre-processing stage 410, it is noted that, in general, the LCS search algorithm receives two input parameters of any nature provided that the following two operations can be applied to the two parameters. First, the LCS must be able to apply GetLength(seq), an operation that determines the length of the sequence (e.g., the number of lines in a text file) to each input parameter. Second, the LCS must be able to apply IsEqual(seq1, index1, seq2, index2), an operation that returns true if the element in seq1 at index1 is equal to the element in seq2 at index2 (e.g., in the case of text files—if the line in the first file at the line number=index1 is equal to the line in the second file at the line number=index2). Index1 must be in the range from 0 to (GetLength(seq1)−1). Index2 must be in the range from 0 to (GetLength(seq2)−1).

Given original sequences in the two compared files that can handle the two required operations and the translation table rendered during step 200, it is possible to build two new "sequences" (seq1' and seq2') suitable for the LCS search algorithm. In an exemplary embodiment of the invention, the modified sequences are provided to the LCS sequence in the following structure (one for each input file):

| seq (original sequence of lines) | xtable (translation table – array of indices) |
|---|---|

This is all that the LCS search algorithm, performed during stage 210, requires.

Given this definition for seq' the two critical LCS operations are implemented, by way of example as follows:

GetLength(seq')
return GetSizeOf(seq '->xtable)/*returns the number of elements in the translation table*/

IsEqual(seq1', index1 , seq2', index2)
return    IsEqual(seq1'->seq,    seq1'->xtable[index1], seq2'->seq, seq2'->xtable[index2])

Figure 4:
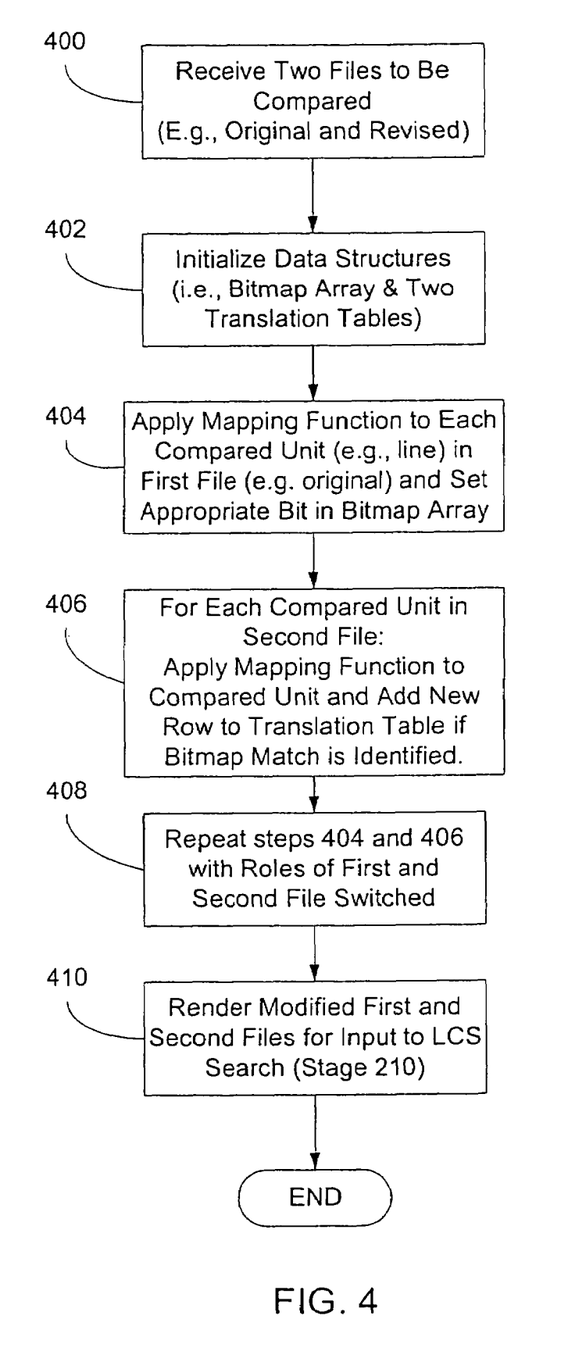
FIG. 4 is a flowchart summarizing the steps for performing the pre-processing stage of FIG. 2 to remove lines present in only one of the two compared files.

Turning to FIG. 4, a flow chart summarizes a set of steps performed during the pre-processing stage 200 in accordance with a particular embodiment of the present invention. In view of the above-described LCS requirements, the pre-processing stage 200 excludes lines in each file that are not identical to the other file involved in the file comparison and provides access by the LCS stage to the remaining (non-excluded) lines in the files. An additional purpose of the pre-processing stage is creating a mapping between original line number assignments in the two compared files and new line assignments resulting from the elimination of unique lines from two compared input files. The differences identified during the pre-processing stage 210, though not a factor during the LCS algorithm performed during stage 210, are preserved for later incorporation in a final document identifying the changes. By convention, the lines that are found to be different and belong to the original file are deletions, and lines that are found to be different that belong to the revised file are insertions.

During step 400, the pre-processing stage 200 receives as its input, by way of example, an original and revised version of a file in the form of sequences of lines. The sequences are accessible by line number. Thus, given a line number, content, length, and a hash value can be determined for the associated line.

Next, at step 402 the pre-processor creates the data structures depicted in FIGS. 3a and 3b. Thus, the pre-processor creates a first table to handle a first file (e.g., an original file) and a second table to handle a second file (e.g., a revised version of the original file). The pre-processor also creates an empty bitmap array (i.e., all bit positions are reset). Each position within the bitmap array corresponds to a particular value rendered by a mapping (e.g., hash) function.

In an embodiment of the invention, the size of the bitmap array is at least twice the number of units to be compared in the larger of the two input files (e.g., original and revised). In the present example, the unit of comparison is a line. Thus, if the original file includes 1,800 lines and the revised file contains 2,000 lines. Then the bitmap array should include at least 4,000 cells. Increasing the number of cells reduces the probability that a unique line will map to an array bit position that has been set by a differing line, thereby allowing a unique line to pass through the initial filtering step. Such "false matches" are not critical since the LCS algorithm incorporated into the LCS search stage 210 identifies and handles the unique line that escaped detection during the pre-processing stage 200. False matches will however degrade the utility of the pre-processing step, and thus a size and mapping function should be chosen such that a large number of such false matches are not encountered. In view of the wide range of input file sizes, in an embodiment of the present invention the size of the bitmap array is dynamically determined during step 402.

During step 404, a mapping function is applied to each unit of comparison (e.g., line) in a first file (e.g., the original file). In an embodiment of the invention, the mapping function operation comprises initially determining a hash value for a line. Thereafter, the hash value is multiplied by the length of the line to render a mapping value. Thereafter, a bit position corresponding to the mapping value is set in a first bit array. This mapping function and setting of a corresponding bit within the bitmap is performed for each line in the first file.

After performing the mapping function on each line of the first file, during step 406 the same mapping function operation is performed upon each line in a second file (e.g., a revised version of the original file), and the translation table for the second file is filled in a manner described herein below. During step 406 the pre-processing function determines for a current line from the second file whether the corresponding bit is set in the bitmap array—indicating that there is potentially a same line in the first file.

After making the comparison, if the corresponding bit is set in the bit array, then a next row is created within the translation table for the second file of the type depicted in FIG. 3a. In an embodiment where the ordinals are not implied, a translated line counter value (initially set to zero) is inserted into the ordinal field of the translation table. The real line number from the line sequence of the second file (in its unaltered form) is inserted in the index field of the translation table. Finally, a reference to the value of the line (e.g., a text string pointer) is provided (an implicit piece of information provided by the translation table). The translated line counter value is then incremented in preparation for a next matching line. Upon completion of step 406 a translation table is rendered for the second file. Each row in the translation table corresponds to a line in the second file that potentially corresponds to a line present in the first file. If a corresponding bit is not set, then the particular line is not present in the first file. The absence of this line is noted by a gap in the index values 320 of the translation table generated during step 406.

After performing the above mapping function operation and comparison on each of the lines of the second file during step 406, the operation is repeated during step 408. However, during step 408 the roles of the first and second files are switched. Thus, during step 408 the mapping function values for each line of the second file are used to set corresponding bits within a bitmap array. Thereafter, each line of the first file is processed in the manner described above (at step 406) to fill a translation table for the first file. The translation table for the first file thus contains a row for each line that is potentially present in the second file.

It is noted that the above description proceeds serially through a sequence of steps and could potentially perform a hashing function twice upon a same line. In an embodiment of the invention, a structure (the previously-mentioned "Real Table") is created for each file. The Real table contains, for each line in a file, a line offset value and associated mapping function value. Also, it is noted that the range of the mapping function typically exceeds the bitmap range. Thus, once a mapping function value is rendered, a modulo operation is performed to render a value within the range of the bitmap. It is further noted that computation cost can be reduced by creating the bitmap for the second file as the mapping function values are rendered for lines of the second file during step 406.

During step 410 (potentially implicit in the case where the translation tables and other described structures are sufficient to define LCS input), the translation tables for the first and second files are utilized to construct (provide) modified first and second LCS input files containing translated sequences of lines corresponding to the lines represented in the translation tables. The translated sequences of lines for the first and second files contain only lines that are potentially present in both files.

In an embodiment of the invention, the output rendered at the end of the pre-processing stage 200, corresponding to completion of step 410, comprises two translation tables, in the form depicted in FIG. 3a for the first and second file, and the first and second files (in original or modified form depending upon the ability of the LCS stage 210 to translate ordinal positions into real lines). The LCS algorithm is applied to the translated line sequences wherein lines present in only one of the two files are skipped. In an embodiment of the invention the actual lines are accessed, during execution of the LCS stage 210, by mapping ordinal positions to actual line numbers provided by the translation tables, and then mapping the actual line numbers to their offsets in the original files.

As mentioned previously herein above, the present invention comprises the helper function performed by stages 200 and 220 of the method summarized in FIG. 2. Thus, any appropriate difference identification algorithm, including by way of example any appropriate LCS search algorithm, can be used during LCS search stage 210. In accordance with an embodiment of the present invention, the output of the LCS algorithm upon completion of stage 210 comprises an description of an LCS (longest common subsequence) for the two modified input files. Such description typically comprises a set of contiguous line identifications (snakes) that make up the corresponding lines in both the first and second files. Due to the pre-processing stage 200, the snakes are identified according to their translated line numbers rather than their real line numbers.

The LCS output of stage 220 is used, by way of example, to guide construction of a file identifying changes (insertions/deletions) between sequences of compared units (e.g., lines) within two files. A file identifying changes between two files is rendered from the sequences of the two files, the LCS snakes, and the translation tables (identifying the changed lines). The compared file sequences supply the actual text for constructing the file. The LCS snakes identify uninterrupted common sequences (of lines), and the translation tables identify the locations and content of lines from the two compared files present in the file identifying the changes.

In the embodiment of the invention described herein above, a bitmap was used to facilitate quickly identifying differences between two files. However, the present invention can be implemented using a wide variety of search mechanisms. One such alternative is creating a binary tree, preferably balanced, containing the hash values for one of the two compared files. The hash values are ordered from lowest to highest within the tree thereby facilitating a binary search for a particular hash value within the tree. Thereafter, hash values of lines from the other file are used to search the binary tree to quickly determine whether a match exists. Other suitable matching methods will be known to those skilled in the art.

Figure 5:
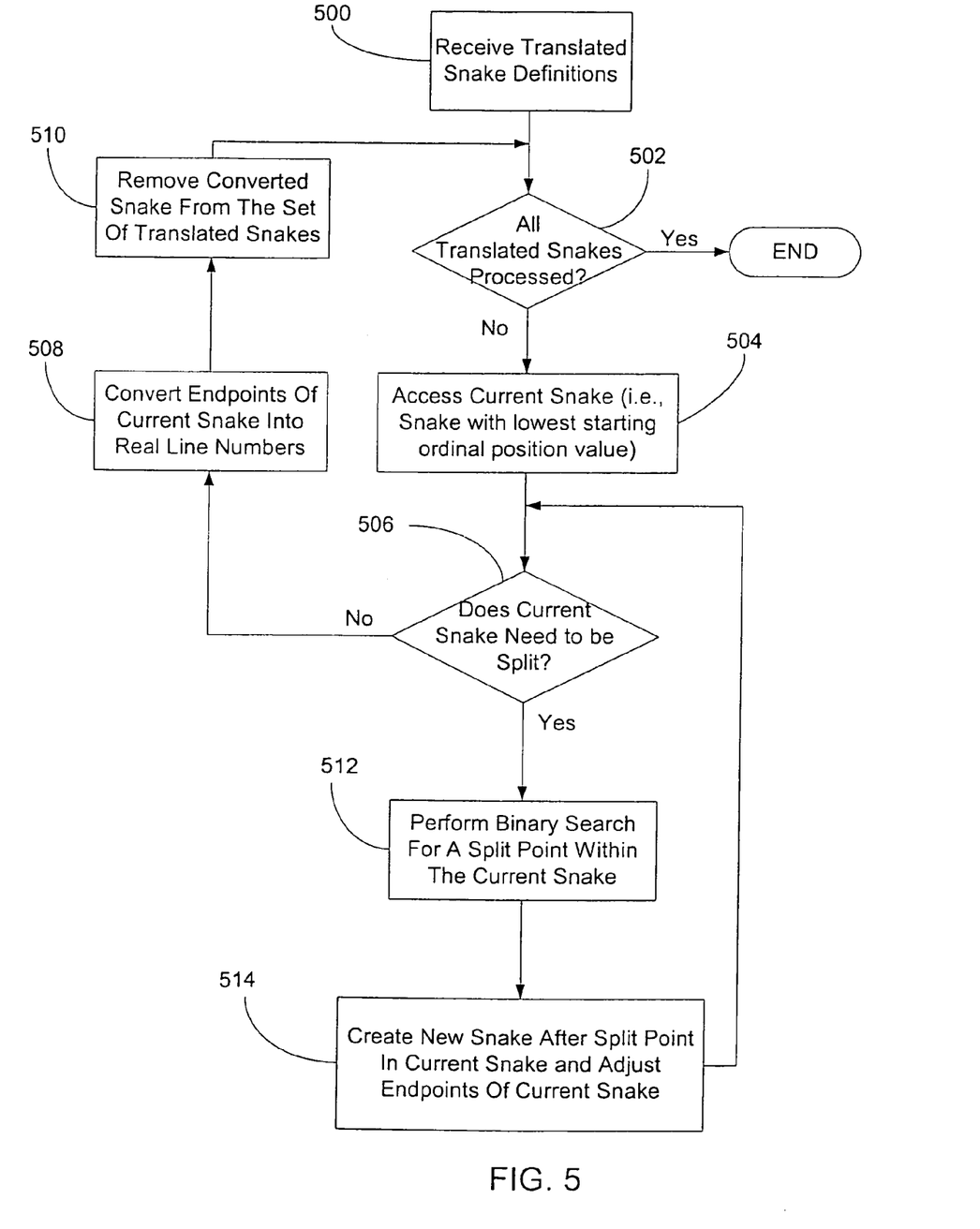
FIG. 5 is a flowchart summarizing the steps for performing the post-processing stage of FIG. 2 to introduce split points within a set of set of snakes rendered by a difference generation stage in accordance with lines removed during the pre-processing stage.

Turning now to FIG. 5, a flowchart depicts a set of steps that inserts splits in the snakes rendered by the LCS search stage that were omitted due to line deletions performed during the pre-processing stage 200 in accordance with the post-processing stage 220. In the course of inserting previously omitted splits in the snakes, the real line numbers are substituted for the translated line numbers utilized by the LCS stage. The method for "restoring" the real line numbers and splits to a set of snakes provided by the LCS stage 210 and defined in terms of translated line (ordinal) numbers is facilitated by the translation tables rendered during the first stage 200.

In general, the post-processing stage 220, the detailed steps of which are depicted by way of example in FIG. 5, comprises analyzing the translated snakes and splitting each snake wherever a line has been modified (as evidenced in the first and second file translation tables) until further splits are not needed. Each time a new split is identified in a current snake, a new snake is added after the identified split point in the current snake. After a snake is determined to have no further splits, the translated endpoints for each file are then converted to real line numbers, and the post-processor adds the converted snake to a list of snakes expressed in real line numbers.

With specific reference to FIG. 5, during step 500, the post-processor receives, the translated set of snakes rendered during the LCS search stage 210. Next, during step 502, the post-processor determines whether all of the translated snakes have been processed. If all translated snakes have been processed, then an end condition is met and the post-processing stage 220 is complete. The result is an LCS definition for two files including splits that were omitted from the previous LCS definition provided by stage 210 due to the pre-processing and deletion of lines that only existed in one of the two files. If however, additional translated snakes remain to be processed, then control passes to step 504.

At step. 504, a current snake of the set of snakes (or remaining portion thereof) rendered by the LCS stage is accessed. In an exemplary embodiment the current snake corresponds to a translated snake having the lowest starting position ordinal value. Next, at step 506 the post-processor determines whether the current snake needs to be split. Whether the current snake needs to be split is determined by comparing the difference between the ordinal positions of the current snake's endpoints with the corresponding differences between the real endpoints as specified in the corresponding index fields within the translation tables created for the first and second files.

If the differences are equal, then no splits exist within the current translated snake, and control passes to step 508 wherein the endpoints of the translated snake are converted to real line numbers for both the first and second files. This is accomplished by referencing the index value fields in the first and second translation files corresponding to the ordinal values of the endpoints of the current snake. Thereafter, during step 510 the translated current snake is deleted from the set of translated snakes rendered by the LCS stage 210. Control then returns to step 502.

If at step 506 the differences are not equal, then a split exists somewhere within the current snake, and control passes to step 512. At step 512 the post-processor locates a split within the current translated snake using a binary search. In an exemplary embodiment, the binary search begins by determining whether the mid-point of the current translated snake is a split point. A split point is located at a selected point in the translated snake if the corresponding real line numbers in either the first and second files are not consecutive at the selected point and next ordinal position. If the currently tested point in the current translated snake is not a split point, then the binary search continues until the split point is located. It is noted that there are many variations to the step of identifying a split point that are contemplated in various embodiments of the present invention. In one alternative embodiment, a linear search is performed to identify split points. In another embodiment, the split point is located by checking an ordinal position in the translation tables positioned before, rather than after, a chosen midpoint of a present range selected during the binary search. These, and other split point search strategies are all contemplated in accordance with various embodiments of the invention.

After identifying a split point, control passes to step 514. At step 514 the post-processor creates a new snake beginning at the split point. A new terminating endpoint is assigned to the current translated snake thereby ending the current snake at the split point located during step 512. Control then returns to step 506.

Having described the detailed steps of stage 220 of a method for rendering a list of snakes in accordance with an embodiment of the present invention, a simple example of the above-described method is provided with reference to two sequences of lines in two files. In this particular example, the first file comprises a sequence of lines represented by the sequence of letters {a,b,c,y,d,e,f,g,h}, and the second file comprises a sequence of lines represented by the sequence of letters {a,b,x,d,e,f,z,g,a}. Matching letters represent lines of the files having identical content. The longest common subsequence of these 2 sequences is {a,b,d,e,f,g}.

Without the optimizing pre-processing and post-processing steps, the LCS search engine receives the two file line sequences and produces a list of snakes: {a,b}, {d,e,f}, {g}. Under the nomenclature used herein, the list of snakes is represented by line numbers. Furthermore, the start point of each identified snake consists of the line number of the first line of the snake, and the end point of each snake consists of the line number after the last line of the snake. The first value within each set of parentheses corresponds to a line number in the first file, and the second value within each set of parentheses corresponds to a line number in the second file. Line numbers begin at 0. Therefore, in the example line sequences the list of snakes is represented as the following: {(0, 0)–(2, 2)}, {(4, 3)–(7, 6)}, and {(7, 7)–(8, 8)}.

Figure 6A:
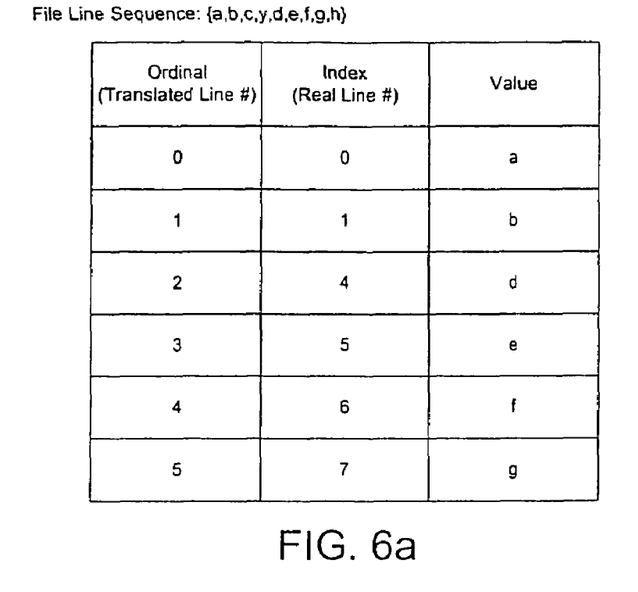
FIGS. 6a and 6b comprise exemplary translation tables for a particular exemplary set of first and second input files.
Figure 6B:
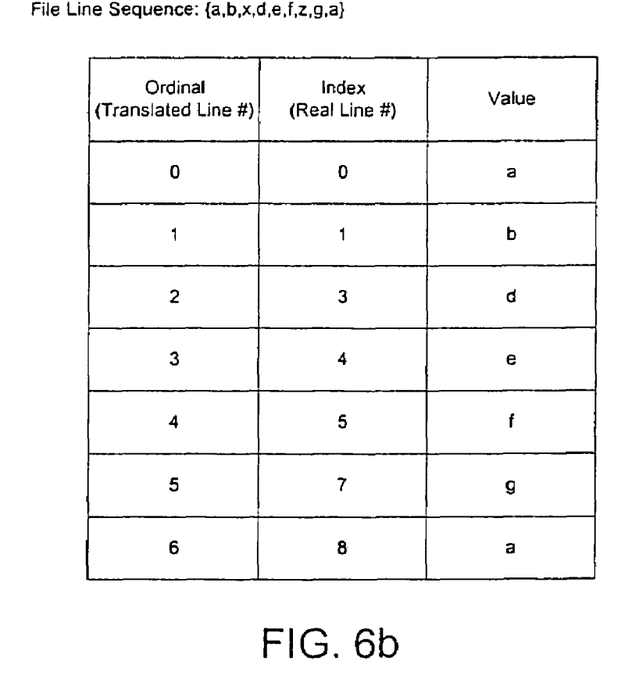

In a system embodying the optimizing pre- and post-processing stages 200 and 220, the pre-processing stage 200 builds the translation tables for the two line sequences set forth in FIGS. 6*a* and 6*b*. Thus, for the sequence {a,b,c,y, d,e,f,g,h}, lines c, y and h are omitted because they are not present in the line sequence within the second file. For the sequence {a,b,x,d,e,f,z,g,a}, lines x and z are omitted because they are not present in the first file.

After the pre-processing stage 200, the LCS search algorithm (stage 210) receives the following translated line sequences as its input: {a,b,d,e,f,g} and {a,b,d,e,f,g,a}. The LCS search algorithm produces a list of snakes. In this case the list of snakes consists of a single snake, {a,b,d,e,f,g}. In translated line numbers the list of snakes output during stage 210 is represented as {(0,0)–(6,6)}—note that the listed end line is actually one greater than the ordinal value of the last line in the snake. Therefore, when calculating snake lengths one must first subtract 1 from the ending line value. The list of snakes is passed to the post-processing stage 220 that re-introduces splits and implements line adjustments as required based upon the original "real" line assignments. The output of the post-processing stage comprises a set of snakes defined by real line numbers in the first and second files.

With reference to the steps of the post-processing stage 220 illustratively depicted in FIG. 5, after confirming that there is indeed a snake that needs to be processed, the single input snake is analyzed during step 506 to determine whether a split is needed by comparing the real and translated snake lengths (i.e., the differences between the translated endpoints and the real endpoints of the snake). In the present example, the translated length (end-beginning) equals ((6–1)–0) or 5. Referring to the ordinal and index fields in the translation tables to identify corresponding real line numbers, the real length of the first file sequence equals (7–0) or 7. The real length of the second file sequence equals (7–0) or 7. Since at least one of the real lengths (in this case both) is not the same as the translated length the snake requires introduction of at least one split, and therefore control passes to step 512 wherein a binary search commences to locate a split in the current snake.

An initial middle point of the translated snake {(0,0)–(6, 6)}, or (2,2) is selected as a possible split point. Referencing the first file translation table, the real line number in the first line sequence corresponding to ordinal value 2 is line 4, and the real number in the first sequence corresponding to the next ordinal value (2+1) is 5. The real line numbers are consecutive, and therefore there is no split point arising from the first file. With reference to the to the second file, the real line numbers corresponding to ordinal positions 2 and 3 in the translated snake are 3 and 4. Again, the real line values are consecutive. Since the real line values for both the first and second file are consecutive, there is no split point at (2,2) of the translated snake.

Since there is no split at (2,2), the post-processor determines whether a split exists on the reduced range (0,0)–(2,2) within the current snake {(0,0)–(6,6)}. The length of the current snake within the reduced range equals (2–0) or 2. The real length of the first file sequence over the reduced range equals (4–0) or 4. The real length of the second sequence equals (3–0) or 3. Again, at least one of the real lengths (i.e., 4 and 3) exceeds the translated length (i.e., 2). Thus, there is a split point in the translated snake ordinal range (0,0)–(2,2). Again, the range is bisected to render a next potential split point in the translated snake at (1, 1). The real line number in the first sequence corresponding to ordinal point 1 is 1, and the real line number in the first sequence corresponding to the next ordinal position (i.e., 2) is line 4. There is therefore a split point between ordinal positions 1 and 2 of the snake. For the second file line sequence the real numbers for the consecutive lines are 1 and 3. Thus, in this case there is a previously deleted line after the translated line I in the second file as well. Since at least one, and in fact both, of the differences between the real line numbers for consecutive ordinal positions in the tested split point are not equal to 1, then the translated snake position (1,1) is indeed a split point.

Thus, control passes to step 514 wherein a split is created in the original snake created by the LCS search stage 210. The split point is the last point of the first snake of the 2 new snakes (i.e., ordinal point (1,1)). Thus, using the endpoint naming convention described herein above, the new list of translated snakes is: {(0,0)–(2,2)}and {(2,2)–(6,6)}. Note that (2,2) marks the endpoint of the first snake in both the first and second files because the coordinates are "one after" the last line of the snake.

After splitting the snake into two snakes, the post-processor returns to the top of its processing loop to again determine whether the first snake needs to be split. In this case, the translated length equals ((2−1)−0) or 1, and the real length of both sequences equal (1−0) or 1. Thus the snake does not have any splits, and control passes to step 508 wherein the translated snake is translated back to real line numbers. The real line number description of the translated snake is {(0,0)–(2,2)}.

Having taken care of the first snake, control passes to step 504 where the next snake, {(2,2)–(6,6)} is processed. Initially the new snake is tested to determine whether it requires splitting. The translated length equals ((6−1)−2) or 3, and the real length of the first sequence equals (7−4) or 3. The real length of the second sequence equals (7−3) or four. Since at least one of the real lengths (i.e., the second sequence) is not the same as the translated length the current snake needs to be split. Control again returns to step 512 where a split point is located in the current snake. The middle point of the snake, (4,4) is tested. The real line number in the first sequence corresponding to ordinal position 4 is line 6 and the real number in the first sequence corresponding to ordinal position 4−1 is line 7. However, the real line numbers for the consecutive ordinal positions for the second sequence are 5 and 7, indicating the presence of a split point. Therefore, another split point exists at ordinal (4,4) of the current snake. Control passes to step 514 and the current snake {(2,2)–(6,6)} is split at point (4,4) to render two new snakes, {(2,2)–(5,5)} and {(5,5)–(6,6)}.

Next, the first snake, {(2,2)–(5,5)}, is tested to determine whether it requires splitting. The translated length equals ((5−1)−2) or 2, and the real length of both sequences equals 2 as well—(6−4 and 5−3 respectively). Therefore, the snake {(2,2)–(5,5)} does not require splitting and control passes to step 508 wherein the snake {(2,2)–(5,5)} is translated back to real line numbers (i.e., {(4,3)–(7,6)}).

Returning to the top of the snake processing loop, the next snake, {(5,5)–(6,6)} is tested to determine whether it needs to be split. It does not since it has a length of zero. Therefore, the last snake is translated back to real line numbers. In this case to real line numbers {(7,7)–(8,8)}. Thus, the post-processing step renders the final set of snakes expressed in the following real line numbers: {(0,0)–(2,2)}, {(4,3)–(7,6)}, and {(7,7)–(8,8)}. Note that this set of snakes is identical to the set of snakes that would have been rendered had the LCS search been performed on the original first and second files. However, the pre- and post-processing stages 200 and 220 provide a significant opportunity to significantly reduce processing cost and time delay in creating the LCS.

It will be appreciated by those skilled in the art that a new and useful method and system for determining/identifying differences between two files has been described herein. In view of the many possible computing environments to which the principles of this invention may be applied and the flexibility of designing and carrying out software development tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for identifying differences between a first file and a second file comprising:
    pre-processing the first and second files to remove units of comparison, from the first and second files, that are only present in one of the first and second files, the pre-processing comprising:
        removing, from a sequence of comparison units for the first and second files, comparison units found within only one of the first and second files to render a translated first file and a translated second file, and
        registering changes to the first and second files, arising during the removing step, within corresponding first and second translation tables;
    executing a difference search upon the translated first file and translated second file to render a preliminary description of differences between the translated first file and translated second file; and
    post-processing the preliminary description of differences to introduce, in accordance with unit sequence positions recorded in the first and second translation tables, differences corresponding to the comparison units found within only one of the first and second files that were previously removed during the pre-processing step.

2. The method of claim 1 wherein the comparison unit is a line.

3. The method of claim 2 wherein the first file and second file comprise source code files.

4. The method of claim 1 wherein the first and second translation tables specify, for a unit in a corresponding translated file, an ordinal position of the unit in the translated file and an index position of the unit within a file prior to removing units during the pre-processing step to render the translated file.

5. The method of claim 1 wherein the pre-processing step comprises symmetrically determining:
    for each unit within the first file whether a unit match exists in the second file; and
    for each unit within the second file, whether a unit match exists in the first file.

6. The method of claim 5 wherein the symmetrical determining step is facilitated by generating, for both the first file and second file, a mapping of the content for each unit of the file to a corresponding bit position within a respective first file bitmap array and second file bitmap array.

7. The method of claim 6 wherein the symmetrical determining step comprises determining whether a unit within the first file matches a unit within the second file by:
    generating a mapping value for the unit within the first file, and
    referencing a position within the second file bitmap array corresponding to the mapping value.

8. The method of claim 6 wherein the generating a mapping step comprises hashing the content of the unit and then multiplying the hashing value by a value corresponding to the length of the unit.

9. The method of claim 5 wherein the symmetrical determining step is facilitated by generating first and second binary trees for the first file and second file, respectively, wherein the nodes of the first and second binary trees store representative values rendered by a mapping function applied to the content of each unit of the file, thereby facilitating a binary search for matches between lines from the first and second files during the preprocessing step.

10. A computer-readable medium including computer-executable instructions for identifying differences between a first file and a second file comprising a sequence of units of comparison and rendering a description of the differences, in a system that includes a differences search engine, the computer-executable instructions facilitating performing a set of steps comprising:
  pre-processing the first and second files to remove units of comparison, from the first and second files, that are only present in one of the two compared files, the pre-processing comprising:
    removing, from a sequence of comparison units for the first and second files, comparison units found within only one of the first and second files to render a translated first file and a translated second file, and
    registering, the changes to the first and second files, arising during the removing step, within corresponding first and second translation tables;
  executing, by the differences search engine, a difference search upon the translated first file and translated second file to render a preliminary description of differences between the translated first file and translated second file; and
  post-processing the preliminary description of differences to introduce, in accordance with unit sequence positions recorded in the first and second translation tables, differences corresponding to the comparison units found within only one of the first and second files that were previously removed during the pre-processing step.

11. The computer-readable medium of claim 10 wherein the comparison unit is a line.

12. The computer-readable medium of claim 11 wherein the first file and second file comprise source code files.

13. The computer-readable medium of claim 10 wherein the first and second translation tables specify, for a unit in a corresponding translated file, an ordinal position of the unit in the translated file and an index position of the unit within a file prior to removing units during the pre-processing step to render the translated file.

14. The computer-readable medium of claim 10 wherein the pre-processing step comprises symmetrically determining:
  for each unit within the first file whether a unit match exists in the second file; and
  for each unit within the second file, whether a unit match exists in the first file.

15. The computer-readable medium of claim 14 wherein the symmetrical determining step is facilitated by generating, for both the first file and second file, a mapping of the content for each unit of the file to a corresponding bit position within a respective first file bitmap array and second file bitmap array.

16. The computer-readable medium of claim 15 wherein the symmetrical determining step comprises determining whether a unit within the first file matches a unit within the second file by:
  generating a mapping value for the unit within the first file, and
  referencing a position within the second file bitmap array corresponding to the mapping value.

17. The computer-readable medium of claim 15 wherein the generating a mapping step comprises hashing the content of the unit and then multiplying the hashing value by a value corresponding to the length of the unit.

18. The computer-readable medium of claim 14 wherein the symmetrical determining step is facilitated by generating first and second binary trees for the first file and second file, respectively, wherein the nodes of the first and second binary trees store representative values rendered by a mapping function applied to the content of each unit of the file, thereby facilitating a binary search for matches between lines from the first and second files during the pre-processing step.

19. A system for identifying differences between a first file and a second file comprising a sequence of units of comparison and rendering a description of the differences, the system comprising:
  a pre-processing stage for removing units of comparison, from the first and second files, that are only present in one of the two compared files, the pre-processing stage including executable instructions for:
    removing, from a sequence of comparison units for the first and second files, comparison units found within only one of the first and second files to render a translated first file and a translated second file, and
    a first and second translation table for registering the changes to the first and second files, arising during the removing step;
  a differences search engine for executing a difference search upon the translated first file and translated second file to render a preliminary description of differences between the translated first file and translated second file; and
  a post-processing stage for introducing into the preliminary description of differences, in accordance with unit sequence positions recorded in the first and second translation tables, differences corresponding to the comparison units found within only one of the first and second files that were previously removed during the pre-processing step.

20. The system of claim 19 wherein the comparison unit is a line.

21. The system of claim 20 wherein the first file and second file comprise source code files.

22. The system of claim 19 wherein the first and second translation tables specify, for a unit in a corresponding translated file, an ordinal position of the unit in the translated file and an index position of the unit within a file prior to removing units during the pre-processing stage to render the translated file.

23. The system of claim 19 wherein the pre-processing stage comprises computer executable instructions for symmetrically determining:
  for each unit within the first file whether a unit match exists in the second file; and
  for each unit within the second file, whether a unit match exists in the first file.

24. The system of claim 23 wherein the symmetrical determining is facilitated by generating, for both the first file and second file, a mapping of the content for each unit of the file to a corresponding bit position within a respective first file bitmap array and second file bitmap array.

25. The system of claim 24 wherein the symmetrical determining comprises determining whether a unit within the first file matches a unit within the second file by:
  generating a mapping value for the unit within the first file, and
  referencing a position within the second file bitmap array corresponding to the mapping value.

26. The system of claim 24 wherein the generating a mapping comprises hashing the content of the unit and then multiplying the hashing value by a value corresponding to the length of the unit.

27. The system of claim 23 wherein the symmetrical determining is facilitated by generating first and second binary frees for the first file arid second file, respectively, wherein the nodes of the first and second binary trees store representative values rendered by a mapping function applied to the content of each unit of the file, thereby facilitating a binary search for matches between lines from the first and second files during the preprocessing stage.

* * * * *

UNITED STATES PATENT AND TRADEMARK OFFICE
CERTIFICATE OF CORRECTION

| | | |
|---|---|---|
| PATENT NO. | : 7,076,486 B2 | Page 1 of 1 |
| APPLICATION NO. | : 11/034965 | |
| DATED | : July 11, 2006 | |
| INVENTOR(S) | : Livshits | |

It is certified that error appears in the above-identified patent and that said Letters Patent is hereby corrected as shown below:

In column 5, line 43–49, delete
"During an LCS search stage 210, after removing the unique lines, the two modified input files containing the remaining lines are provided to an LCS search engine.
The LCS search engine performs well-known operations to render a description of a longest common subsequence based upon the modified input files rendered by the pre-processing stage 200."
and insert
-- During an LCS search stage 210, after removing the unique lines, the two modified input files containing the remaining lines are provided to an LCS search engine. The LCS search engine performs well-known operations to render a description of a longest common subsequence based upon the modified input files rendered by the pre-processing stage 200. --, therefor.

In column 7, line 21, after "index2)" insert -- : --.

In column 12, line 57, delete "I" and insert -- 1 --, therefor.

In column 13, line 26, delete "4–1" and insert -- 4+1 --, therefor.

In column 15, line 7, in Claim 10, delete "inctudes" and insert -- includes --, therefor.

In column 15, line 18, in Claim 10, delete "registering," and insert -- registering --, therefor.

Signed and Sealed this

Thirtieth Day of March, 2010

David J. Kappos
*Director of the United States Patent and Trademark Office*